United States Patent
Murayama (10) Patent No.: US 9,490,907 B2
(45) Date of Patent: Nov. 8, 2016

(54) OPTICAL RECEIVER AND DETECTION METHOD

(71) Applicant: SUMITOMO ELECTRIC INDUSTRIES, LTD., Osaka-shi, Osaka (JP)

(72) Inventor: Tetsu Murayama, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 36 days.

(21) Appl. No.: 14/629,080

(22) Filed: Feb. 23, 2015

(65) Prior Publication Data

US 2015/0244469 A1 Aug. 27, 2015

(30) Foreign Application Priority Data

Feb. 24, 2014 (JP) .................. 2014-032988

(51) Int. Cl.
| | |
|---|---|
| *H04B 10/69* | (2013.01) |
| *H04B 10/079* | (2013.01) |
| *H04J 14/02* | (2006.01) |
| *H04Q 11/00* | (2006.01) |
| *H04B 10/40* | (2013.01) |

(52) U.S. Cl.
CPC ...... *H04B 10/691* (2013.01); *H04B 10/07955* (2013.01); *H04B 10/40* (2013.01); *H04J 14/0227* (2013.01); *H04Q 11/0071* (2013.01); *H04Q 2011/0016* (2013.01); *H04Q 2011/0039* (2013.01); *H04Q 2011/0083* (2013.01)

(58) Field of Classification Search
CPC .......... H04B 10/691; H04B 10/07955; H04B 10/40; H04J 14/0227; H04Q 11/0071; H04Q 2011/0083; H04Q 2011/0039; H04Q 2011/0016

See application file for complete search history.

(56) References Cited

U.S. PATENT DOCUMENTS

| 2008/0129369 A1* | 6/2008 | Ivancevic | ............ H03K 17/005 327/410 |
| 2012/0213526 A1* | 8/2012 | Tanaka | ................... H04B 10/40 398/135 |

FOREIGN PATENT DOCUMENTS

JP 62-235834 10/1987

* cited by examiner

*Primary Examiner* — Shi K Li
*Assistant Examiner* — Mina Shalaby
(74) *Attorney, Agent, or Firm* — Smith, Gambrell & Russell, LLP.

(57) ABSTRACT

The integrated optical receiver module includes a plurality of PDs each converting an optical signal to a current signal, and outputs a current signal selected from a plurality of current signals. The RSSI circuit converts the current signal into a voltage signal, outputs a first amplified signal obtained by amplifying the voltage signal by a first gain, and outputs a second amplified signal obtained by amplifying the voltage signal by a second gain larger than the first gain. The MCU outputs a first selection signal to the integrated optical receiver module to acquire intensity of the first amplified signal with respect to all of the current signals in a predetermined order, outputs a second selection signal to the integrated optical receiver module to acquire intensity of the second amplified signal with respect to all of the current signals in the ascending order of the acquired intensity of the first amplified signal, and derives intensity of each of the optical signals from the acquired intensity of the respective second signals.

7 Claims, 9 Drawing Sheets

OPTICAL RECEIVER AND DETECTION METHOD

BACKGROUND OF THE INVENTION

Field of the Invention

The present invention relates to an optical receiver and a detection method.

Related Background of the Invention

Multi-Source Agreement (MSA) defines the standards about an external shape, pin assignment, electrical characteristics, and optical characteristics, and so on of an optical transceiver. Most of the MSAs require also a functionality of digital diagnostic monitoring (DDM) to monitor/diagnose a state of optical communication and an internal operation state of the optical transceiver in real time and notifies an external device (upper layer) of a diagnosis result through a predetermined digital communication interface. The information on the state of the optical communication notified by the DDM includes, for instance, received signal intensity of an optical signal input to the optical transceiver as a part thereof. A monitor circuit of a prior art monitors the received signal intensity under a restricted frequency bandwidth, so that a monitor value is acquired with necessary measurement precision by suppressing an influence of noise (for example, JP-A-62-235834).

Meanwhile, recently, development of an optical transceiver such as 100G form-factor pluggable (CFP) has progressed and realized downsizing and low power consumption for a high speed and a large capacity of a communication network. In an optical receiving unit of the CFP, a multiplexed optical signal comprising four optical signals with different wavelengths from each other is separated by an optical demultiplexer, and the received signal intensity is measured for each of the four optical signals separated by the optical multiplexer. Here, if the conventional technology is applied to the four optical signals as it is, a total size of the respective measurement circuits and number of wiring lines interconnecting each of the measurement circuits with other may increase fourfold and thus, the conventional technology is not preferable from the viewpoint of downsizing.

As an approach to solve the problem, one may consider configuring one monitor circuit to measure received signal intensity by sequentially switching the four optical signals one by one and measuring the respective received signal intensitys in a time division method. However, a large capacitance of a capacitor provided in the monitor circuit is needed to improve measurement precision by restricting a the frequency band of the monitor circuit. Such a monitor circuit with a restricted frequency band may cause a rising edge and a falling edge of an output waveform of the monitor circuit to become blunt. When received signals are continuously measured in a short period, amplitude of the output waveform corresponding to the received signal intensity may not be acquired with required measurement precision. In this case, it is necessary to increase a switching period to measure the continuous received signals. As a result, a measurement time of the received signal intensity increases and a measurement result may not be transmitted to an upper layer in a time defined by the MSA or the frequency of measuring the received signal intensity per unit time may decrease.

The present invention has been made to solve the above-described problems and an object of the present invention is to provide a optical receiver and a detection method that can decrease a measurement time while securing measurement precision, in measurement of received signal intensity.

SUMMARY OF THE INVENTION

An aspect of the present invention relates to a optical receiver to receive a multiplexed optical signal having a plurality of optical signals. The optical receiver includes: an optical receiver module configured to have a plurality of photo detectors each converting an optical signal to a current signal, the optical receiver module outputting a current signal selected from a plurality of current signals; a detecting circuit configured to convert the current signal output from the optical receiver module into a voltage signal, output a first amplified signal obtained by amplifying the voltage signal by a first amplifying circuit with a first gain, and output a second amplified signal obtained by amplifying the voltage signal by a second amplifying circuit with a second gain larger than the first gain; and an MCU configured to output a selection signal to the optical receiver module to select one of the current signals, and receive the first amplified signal and the second amplified signal each corresponding to the selected current signal, and store intensity of the first amplified signal as digital data with respect to the selected current signal, wherein the MCU switches the selection signal to acquire intensity of the second amplified signal with respect to all of the current signals in the ascending order of the stored intensity of the first amplified signal, and derives intensity of each of the optical signals from the acquired intensity of the second amplified signal.

DESCRIPTION OF THE PREFERRED EMBODIMENTS

First, embodiments of the present invention will be described.

An aspect of the present invention relates to a optical receiver to receive a multiplexed optical signal having a plurality of optical signals. The optical receiver includes: an optical receiver module configured to have a plurality of photo detectors each converting an optical signal to a current signal, the optical receiver module outputting a current signal selected from a plurality of current signals; a detecting circuit configured to convert the current signal output from the optical receiver module into a voltage signal, output a first amplified signal obtained by amplifying the voltage signal by a first amplifying circuit with a first gain, and output a second amplified signal obtained by amplifying the voltage signal by a second amplifying circuit with a second gain larger than the first gain; and an MCU configured to output a selection signal to the optical receiver module to select one of the current signals, and receive the first amplified signal and the second amplified signal each corresponding to the selected current signal, and store intensity of the first amplified signal as digital data with respect to the selected current signal, wherein the MCU switches the selection signal to acquire intensity of the second amplified signal with respect to all of the current signals in the ascending order of the stored intensity of the first amplified signal, and derives intensity of each of the optical signals from the acquired intensity of the second amplified signal.

In the optical receiver, the intensity of the first amplified signal amplified by the first gain is acquired on the basis of the current signal output by each of the photo detectors. In addition, the intensity of the second amplified signal is acquired on the basis of the second selection signal to select each photo detector in ascending order of the intensity of the first amplified signal. When the second amplified signal is a signal amplified by the gain higher than the gain in the case of the first amplified signal, it is necessary to narrow a band of a signal to be measured to remove noise at the time of amplification to obtain a high gain amplification signal such as the second amplified signal. When the band is narrowed, a rising edge and a falling edge of an output waveform of the amplification signal may be blunt. For example, if a intensity of a previously output received signal is large and a intensity of a subsequently output received signal is small, an output waveform of the subsequently output received signal may be embedded in a tail of an output waveform of the previously output received signal. For this reason, in the related art, it is necessary to increase a switching time of the received signal to a degree at which the output waveform of the subsequently received signal is not embedded in the blunt output waveform, in continuous measurement. However, in the optical receiver according to the present invention, because the second amplified signal is acquired in ascending order of the intensity of the first amplified signal for each wave acquired previously, the output waveform of the subsequently output received signal is not embedded in the output waveform of the previously output received signal. For this reason, the received signal intensity can be measured without increasing the switching time of the received signal in consideration of bluntness of the output waveform. Thereby, when the received signal intensity is measured, a measurement time can be decreased, and measurement precision can be secured.

In addition, in the optical receiver, the second amplifying circuit has a response time longer than a response time of the first amplifying circuit. If the gain increases in the amplifying circuit, it is effective to make a signal passing band become low by a low-pass filter circuit for noise removal, for example. However, the time constant of the output signal is increased by making the passing band become low. For this reason, the second amplifying circuit has a response time longer than a response time of the first amplifying circuit. That is, the first amplifying circuit is set as a low-gain amplifier in which the bluntness of the output waveform is small and the second amplifying circuit is set as a high-gain amplifier in which the bluntness of the output waveform is large, so that a signal is avoided from being embedded in the tail of the output waveform, regardless of selection order of the photo detectors, in the output signal of the first amplifying circuit.

In addition, in the optical receiver, the second amplifying circuit includes an integration circuit having a capacitor, the response time of the second amplifying circuit depending on capacitance of the capacitor. By adjusting the response time by the capacitor, the response time of the second amplifying circuit can be easily adjusted.

In addition, in the optical receiver, the first amplifying circuit is connected in parallel to the second amplifying circuit. In addition, in the optical receiver, the second amplifying circuit is connected in cascade to the first amplifying circuit. The parallel connection or the cascade connection can be selected according to a characteristic of each optical receiver. Even in the case of any configuration, an output of each amplifying circuit is input to the MCU and a measurement time can be decreased while measurement precision is secured.

Another aspect of the present invention relates to a method to detect intensity of respective optical signals of a multiplexed optical signal by a plurality of photo detectors each converting respective optical signals to respective current signals. The method includes steps of: detecting current intensity corresponding to respective optical signals through a current-to-voltage converter and a first amplifying circuit with a first gain, as switching respective current signals one by one with respect to all of the optical signals; storing the current intensity into a memory as digital data with respect to all of the optical signals; and, determining the current intensity of the respective optical signals through the current-to-voltage converter and a second amplifying circuit with a second gain larger than the first gain, as switching the respective current signals one by one in the ascending order of the current intensity stored for the respective currents in the memory.

In addition, in the method, further including a step of determining the order of switching respective current signals output by the photo detectors one by one to detect current intensity corresponding to respective optical signals through the current-to-voltage converter and the first amplifying circuit.

Detail of Embodiment of Present Invention

A specific example of a optical receiver according to an embodiment of the present invention will be described below with reference to the drawings. The present invention is not limited to the example and various changes can be made without departing from the scope of the present invention.

Figure 1:
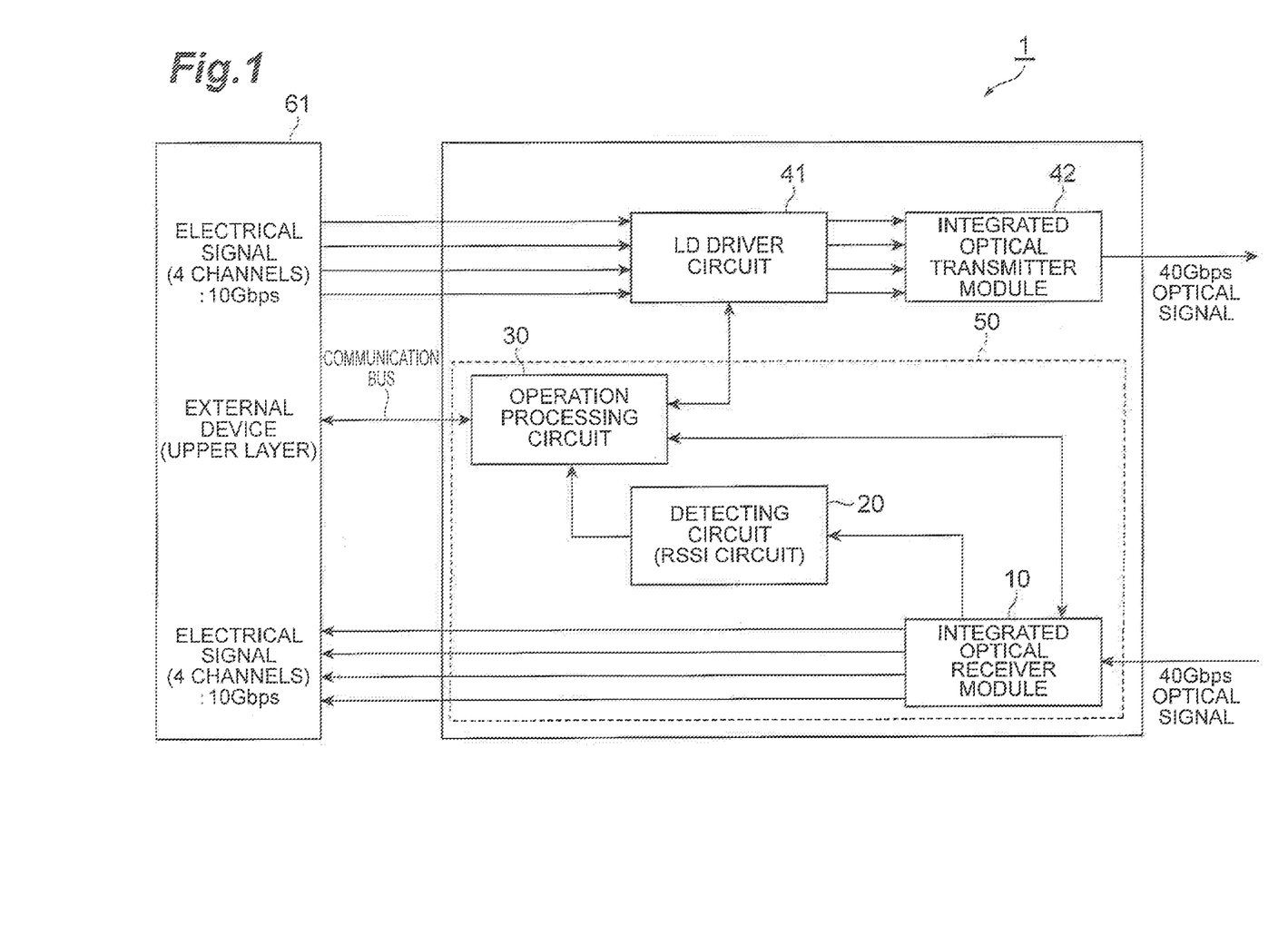
FIG. 1 is a block diagram illustrating a configuration of an optical transceiver according to an embodiment.

FIG. 1 is a block diagram illustrating a configuration of an optical transceiver according to this embodiment. An optical transceiver 1 is, for example, a 40-gigabit optical transceiver that transmits and receives respective multiplexed optical signals via respective optical fibers in a two-core bidirectional manner. Each of the multiplexed signals has four optical signals with respective wavelengths different from each other. The optical transceiver 1 is configured as a module that can be hot-plugged into an external device 61 (upper layer). The standards about an external shape, terminal placement, an electrical characteristic, and an optical characteristic of the optical transceiver are defined by the multi-source agreement (MSA) standard of quad small form-factor pluggable (QSFP+), for example. Hereinafter, the optical transceiver 1 is described as the 40-gigabit optical transceiver. However, the optical transceiver according to the present invention may be a 100-gigabit optical transceiver transmitting and receiving respective multiplexed optical signals in a two-core bidirectional manner. Each of the multiplexed optical signals has four optical signals with wavelengths in a band of 1300 nm, specifically, an optical transceiver defined by the respective MSA standards of 100G form-factor pluggable (CFP) 2 or CFP 4.

The optical transceiver 1 includes an integrated optical receiver module (optical receiver module) 10, a detecting circuit (RSSI circuit; Received Signal Intensity Indication circuit) 20, an MCU (Micro Controller Unit) 30, an LD driver circuit 41, and an integrated optical transmitter module 42.

The integrated optical receiver module 10 receives a 40-Gbps optical signal as wavelength multiple signal (multiplexed optical signal), demultiplexes the 40-Gbps optical signal into four optical signals with different wavelengths from each other, converts each optical signal into a 10-Gbps electrical signal, and outputs the 10-Gbps electrical signal. The four 10-Gbps electrical signals output by the integrated optical receiver module 10 are output from the optical transceiver 1 to an external device. However, a configuration in which the signal is input to clock data recovery (CDR) (not illustrated in the drawings) to be subjected to the clock data recovery, is converted into an electrical signal by a signal processing integrated circuit (not illustrated in the drawings), and is output, can be adopted depending on a kind of the optical transceiver.

After the integrated optical transmitter module 42 converts four independent 10-Gbps electrical signals into four optical signals with different wavelengths from each other, the integrated optical transmitter module 42 multiplexes four optical signals and outputs a 40-Gbps optical signal as a wavelength multiple signal (a multiplexed optical signal). In addition, a configuration in which an electrical signal input to the integrated optical transmitter module 42 is converted into four 10-Gbps electrical signals by the signal processing integrated circuit (not illustrated in the drawings) and is subjected to the clock data recovery in the CDR (not illustrated in the drawings) may be adopted depending on a kind of the optical transceiver 1. In the integrated optical transmitter module 42, four laser diodes (LDs) having different oscillation wavelengths and an optical multiplexer to multiplex respective output lights output from the LDs are mounted (not illustrated in the drawings). In addition, when the LDs need to be cooled down, a thermoelectric cooler (TEC) is mounted (not illustrated in the drawings).

The LD driver circuit 41 outputs driving signals to the LDs (not illustrated in the drawings) in the integrated optical transmitter module 42 and drives the four LDs having the different oscillation wavelengths from each other in parallel. For this reason, the four driving signals output by the LD driver circuit 41 are input to the different four LDs (not illustrated in the drawings), respectively.

Figure 2:
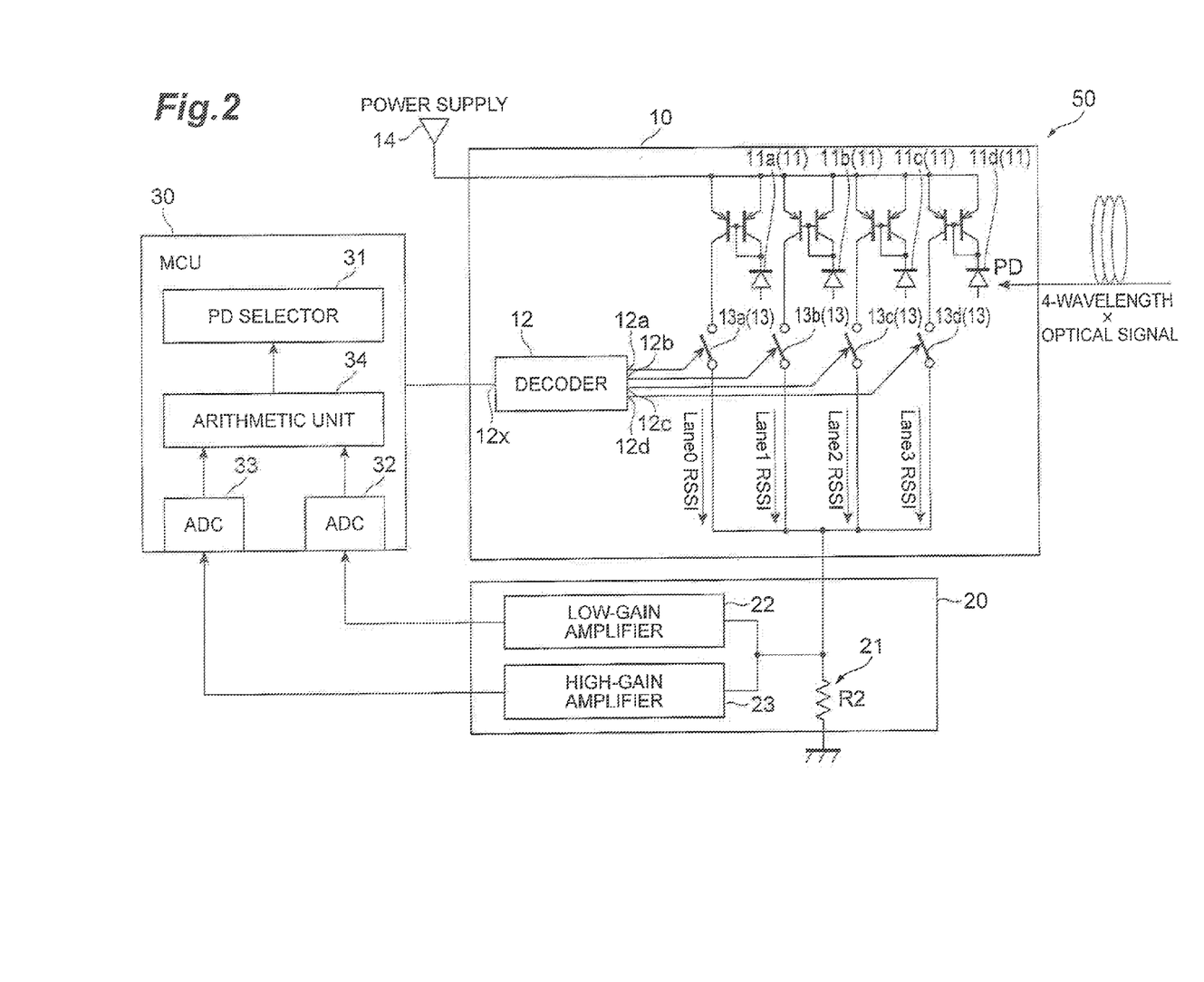
FIG. 2 is a diagram illustrating a configuration of an optical receiving unit of FIG. 1.

The integrated optical receiver module 10, the RSSI (received signal intensity indication) circuit 20, and the MCU (micro controller unit) 30 among the individual components of the optical transceiver 1 described above configure an optical receiving unit 50 (optical receiver) (refer to FIG. 2). The optical receiving unit 50 measures the received signal intensity for each wavelength, namely for the respective optical signals with the four different wavelengths (4-wavelength multiple signal) input as a multiplexed optical signal from the outside. Hereinafter, the individual components of the optical receiving unit 50 will be described in detail with reference to FIG. 2. FIG. 2 is a diagram illustrating a configuration of the optical receiving unit 50. As described above, the integrated optical receiver module outputs, for example, the four 10-Gbps electrical signals. FIG. 2 does not illustrate portions associated with a function for optical communication (transmitting and receiving) and illustrates only portions associated with detection of the received signal intensity (intensity of the respective optical signals multiplexed in a multiplexed optical signal).

The integrated optical receiver module 10 has a PD: photo detector 11, a decoder 12, and an analog switch 13 and is fed by a power supply 14. The PD 11 includes four PDs 11a, 11b, 11c, and 11d and cathodes of the individual PDs 11a, 11b, 11c, and 11d are electrically connected to the power supply 14 through a current mirror circuit. In the integrated optical receiver module 10, four optical signals separated for each wavelength by an optical demultiplexer (not illustrated in the drawings) are input to the PDs 11a, 11b, 11c, and 11d, respectively. The PDs 11a, 11b, 11c, and 11d convert the respective input optical signals into respective electrical signals and output the electrical signals as current signals.

The decoder 12 and the analog switch 13 configure a selecting unit that selects one current signal input to the RSSI circuit 20 among the current signals output from the PDs 11a, 11b, 11c, and 11d, according to the selection signal input by the MCU 30. The analog switch 13 includes analog switches 13a, 13b, 13c, and 13d provided to correspond to the PDs 11a, 11b, 11c, and 11d. The analog switch 13 can pass or shut off the current signal output from the corresponding PD 11. Specifically, the analog switch 13 is set to shut off the current signal from the PD 11 in a normal mode and is set to pass the current signal from the PD 11 only when a passing signal is input from the decoder 12. The current signal is selected to detect the received signal intensity (intensity of the one of the optical signals) and the integrated optical receiver module 10 has a circuit (not illustrated in the drawings) that individually converts four current signals output from the PD 11 into voltage signals in parallel to perform communication at a predetermined data rate. Here, the current signal output from the PD 11 is a current signal that is output from the current mirror circuit after receiving the current signal output by the PD 11.

The decoder 12 includes one input terminal 12x to which the selection signal from the MCU 30 is input and four output terminals 12a, 12b, 12c, and 12d that are electrically connected to the analog switches 13a, 13b, 13c, and 13d. If the selection signal is input from the MCU 30 to the input terminal 12x, the decoder 12 outputs a passing signal from one output terminal, for example, the output terminal 12a, according to the selection signal. When the passing signal is output from the output terminal 12a, the passing signal is input from the decoder 12 to the analog switch 13a. For this reason, the current signal output from the PD 11a is input to the RSSI circuit 20.

Figure 3:
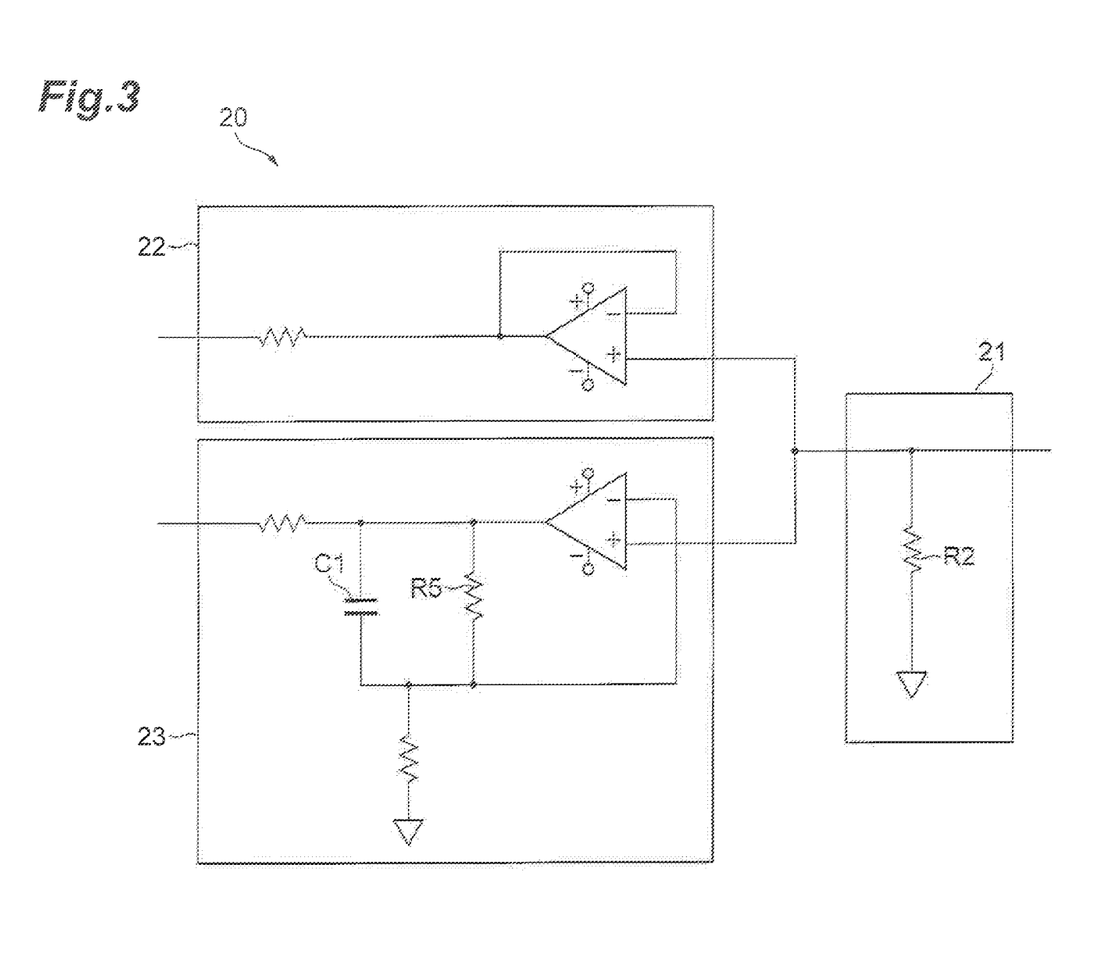
FIG. 3 is a diagram illustrating a circuit configuration of an RSSI circuit 20 of FIG. 2.

The RSSI circuit 20 is a detecting circuit that converts the current signal output by one PD 11 selected from the plurality of PDs 11a, 11b, 11c, and 11d into a voltage signal, amplifies the voltage signal by a predetermined amplifying circuit, and outputs the voltage signal as an amplification signal. The RSSI circuit 20 has a current-to-voltage converter 21, a low-gain amplifier 22 (first amplifying circuit), and a high-gain amplifier 23 (second amplifying circuit) of which gain is higher than gain of the low-gain amplifier. Hereinafter, the RSSI circuit 20 will be described with reference to FIG. 3. FIG. 3 is a diagram illustrating a circuit configuration of the RSSI circuit 20.

The current-to-voltage converter 21 has a resistor R2 to convert the current signal output from the PD 11 of the integrated optical receiver module 10 into a voltage signal. The resistor R2 is connected to the integrated optical receiver module 10 by one wiring line. The current of the selected PD 11 flows to the resistor R2, so that the current signal is converted into the voltage signal. The low-gain amplifier 22 and the high-gain amplifier 23 are connected to the resistor R2 in parallel and the voltage signal output from the current-to-voltage converter 21 is input to the low-gain amplifier 22 and the high-gain amplifier 23.

The low-gain amplifier 22 is an amplifying circuit that amplifies the voltage signal input to the current-to-voltage converter 21 by gain of one time and outputs the voltage signal as a first amplified signal. Meanwhile, the high-gain amplifier 23 is an amplifying circuit that amplifies the voltage signal input to the current-to-voltage converter 21 by gain of 20 times and outputs the voltage signal as a second amplified signal. A resistor R5 and a capacitor C1 connected to the resistor R5 in parallel are provided at an output stage of the high-gain amplifier 23. In the high-gain amplifier, in the case in which input power of a signal is small and an S/N ratio is bad, when noise is also amplified at the time of amplifying a voltage of the resistor by the amplifying circuit, the noise that can be included in the amplification signal can be removed by narrowing an frequency band of the second amplified signal by the capacitor C1 (noise removal by frequency band restriction). The high-gain amplifier 23 can adjust a frequency band of a passed signal by changing a capacitance of the capacitor C1. Therefore, the capacitor C1 and the resistor R5 configure an integration circuit with a time constant depending on the capacitance.

Figure 7:
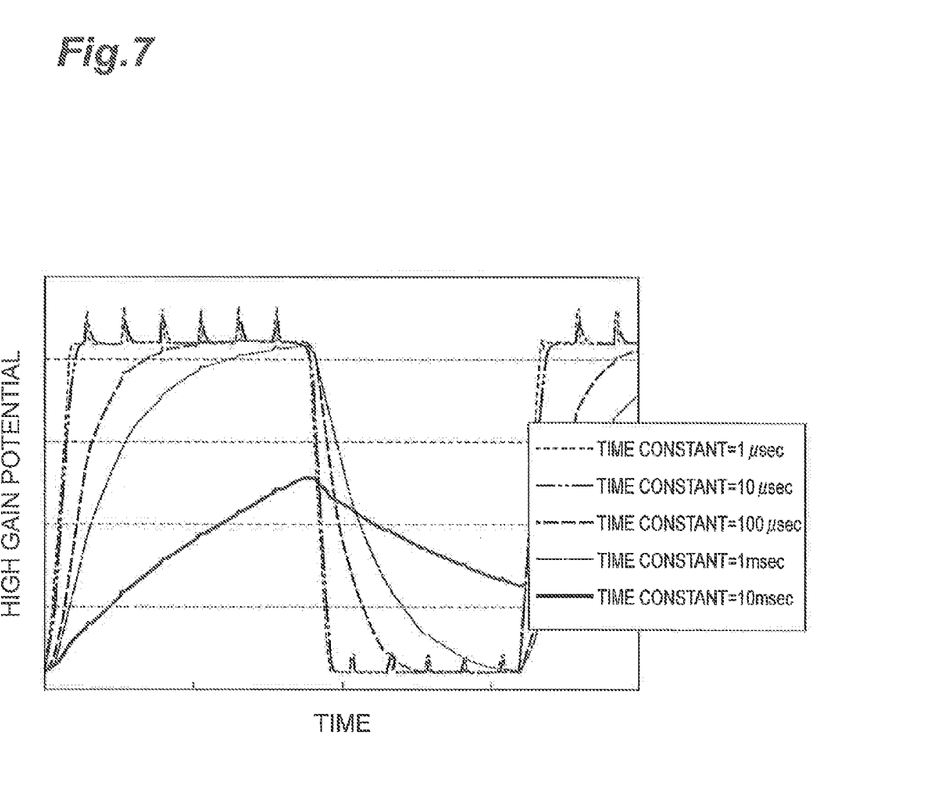
FIG. 7 is a diagram illustrating a relationship of a time constant and a rising edge and a falling edge of output waveforms in a high-gain amplifier of FIG. 3.

Here, an output waveform of the second amplified signal output from the high-gain amplifier 23 will be described using FIG. 7. FIG. 7 is a diagram illustrating a relationship of a time constant and a rising edge and a falling edge of output waveforms. In the high-gain amplifier 23, when a time constant T is shown by T=C1×R5, as illustrated in FIG. 7, if a value of the time constant T increases (that is, a value of C1 increases), both a rising edge and a falling edge of an output waveform are delayed and the output waveform has a shape with a long tail. If a time of the tail is continuous from a signal transition point of time functioning as a starting point, for example, a time necessary until an intensity (intensity of the signal), that is, the received signal intensity becomes a predetermined value or less, at the falling edge of the output waveform of the second amplified signal, is defined as a response time, a response time of the low-gain amplifier 22 not provided with a capacitor is shorter than a response time of the high-gain amplifier 23.

The MCU 30 inputs a selection signal to select one PD 11 to the integrated optical receiver module 10 and derives the received signal intensity (intensity) of the signal on the basis of the amplification signals output by the low-gain amplifier 22 and the high-gain amplifier 23. The MCU 30 has a PD selector 31, analog-to-digital converters (ADCs) 32 and 33, and a arithmetic unit 34. The MCU 30 and the integrated optical receiver module 10 are connected by I-squared-C (I2C) or a serial peripheral interface (SPI) serial communication bus and the selection of the PD 11 for the integrated optical receiver module 10 is instructed by serial communication.

The ADCs 32 and 33 perform analog/digital (AD) conversion on the amplification signal output from the RSSI circuit 20. The ADC 32 is electrically connected to the low-gain amplifier 22 through an independent wiring line and outputs the first amplified signal (first digital signal) after the AD conversion. In addition, the ADC 33 is electrically connected to the high-gain amplifier 23 through an independent wiring line and outputs the second amplified signal (second digital signal) after the AD conversion. Hereinafter, the first digital signal after the AD conversion is described as the first amplified signal and the second digital signal after the AD conversion is described as the second amplified signal.

Resolution of each of the ADCs 32 and 33 is, for example, 10 bits. In order to measure the received signal intensity of the signal of each wavelength in the optical transceiver, when resolution of about 14 bits is required in the ADC, in this embodiment, a dynamic range to be a ratio of a minimum value and a maximum value of an identifiable signal is extended by combining the ADCs 32 and 33 of which the resolution is 10 bits and measurement of received signal intensity in a desired range is realized without providing the ADC of which the resolution is 14 bits. In this way, a configuration that is advantageous to cost reduction is realized.

The PD selector 31 inputs a selection signal to select one PD 11 to the decoder 12 of the integrated optical receiver module 10. The PD selector 31 uses the first selection signal and the second selection signal as the selection signal. Both the first selection signal and the second selection signal are input by the number of PDs 11. That is, in this embodiment, both the first selection signal and the second selection signal are input by four. The first selection signal is a selection signal in which selection order of each PD 11 is previously determined. For example, when order of the PD 11a, the PD 11b, the PD 11c, and the PD 11d is previously determined as selection order of the first selection signal, the PD selector 31 inputs the first selection signal to the decoder 12 in the order of the PD 11a, the PD 11b, the PD 11c, and the PD 11d, at all times.

In addition, the second selection signal is a selection signal in which the selection order of each PD 11 is determined, on the basis of the first amplified signal output by the ADC 32 according to the first selection signal. Specifically, the second selection signal is a selection signal to select each PD 11 in ascending order of a intensity (received signal intensity) of the first amplified signal corresponding to the first selection signal. For example, when the received signal intensity of the first amplified signal for the first selection signal is small in order of the PD 11b, the PD 11d, the PD 11a, and the PD 11c, the PD selector 31 inputs the second selection signal in order of the PD 11b, the PD 11d, the PD 11a, and the PD 11c.

The arithmetic unit 34 derives the received signal intensity on the basis of the first amplified signal output by the ADC 32 and the second amplified signal output by the ADC 33. The arithmetic unit 34 executes a different process when the selection signal input from the PD selector 31 is the first selection signal and when the selection signal is the second selection signal.

Figure 4:
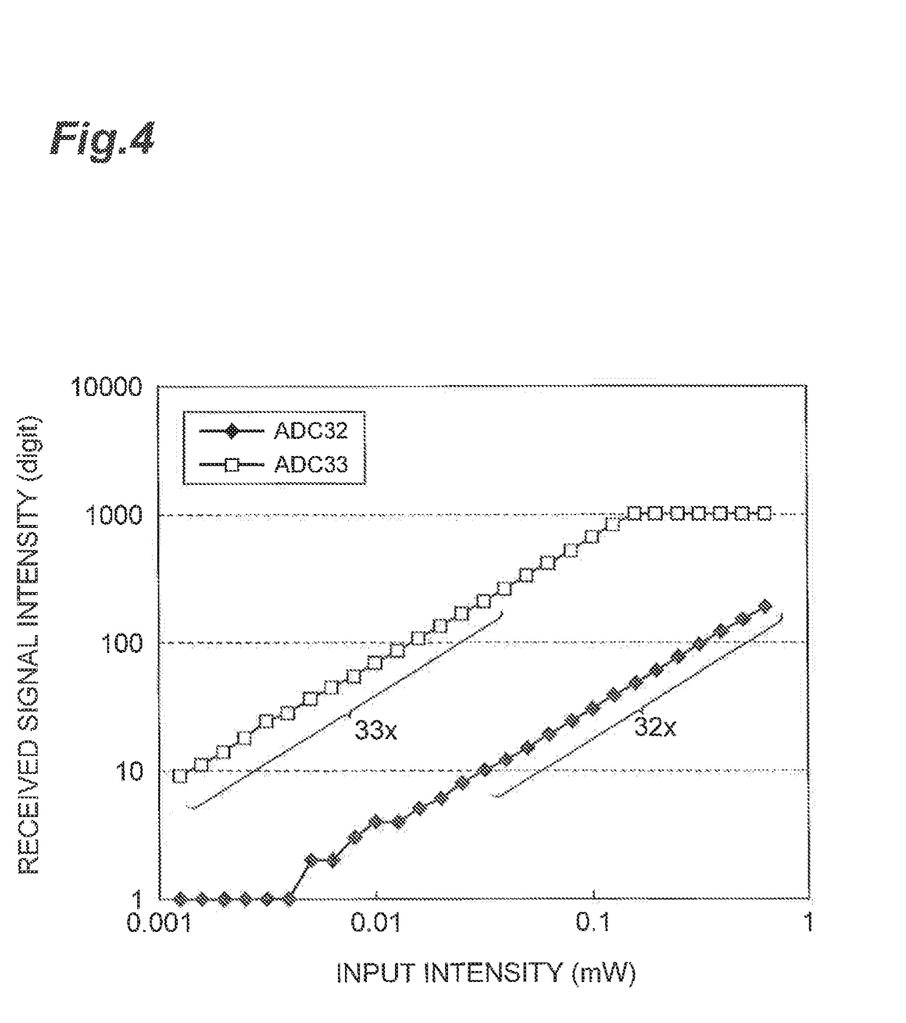
FIG. 4 is a diagram illustrating a relationship between input intensity and received signal intensity derived by an arithmetic unit 34 of FIG. 2.

Here, as illustrated in FIG. 4, the input intensity (illustrated by a horizontal axis of FIG. 4) to be the intensity of the optical signal input to the PD 11 and the received signal intensity derived by the arithmetic unit 34 are in a correspondence relationship. When the input optical signal is a relatively low input (when the input intensity is in a low input range 33x illustrated in FIG. 4), the received signal intensity is derived by the arithmetic unit 34 on the basis of the second amplified signal output by the ADC 33. Because the received signal intensity in the low input range 33x is the received signal intensity after amplification by the high-gain amplifier 23, the arithmetic unit 34 sets 1/20 of the received signal intensity as the final received signal intensity. In addition, when the input optical signal is a relatively high input (when the input intensity is in a high input range 32x illustrated in FIG. 4), the received signal intensity is derived by the arithmetic unit 34 on the basis of the first amplified signal output by the ADC 32.

When the first selection signal is input from the PD selector 31, the arithmetic unit 34 acquires the first amplified signal output by the ADC 32 and derives the received signal intensity of the first amplified signal for each PD 11. The derived received signal intensity of the first amplified signal for each PD 11 is input to the PD selector 31 and is used for determining the selection order of the PD 11 in the second selection signal. In addition, the derived received signal intensity of the first amplified signal for each PD 11 is stored in a storage device (not illustrated in the drawings) by the arithmetic unit 34. Here, information stored in the storage device may be a intensity of an amplification signal to be base data of the derivation, not the derived received signal intensity.

Meanwhile, when the second selection signal is input from the PD selector 31, the arithmetic unit 34 determines whether the received signal intensity of the first amplified signal of each PD 11 stored when the first selection signal is input is larger than a predetermined value (for example, 0.05 mW). In addition, when the received signal intensity is larger than the predetermined value, the arithmetic unit 34 derives the received signal intensity of the first amplified signal as the final received signal intensity. In addition when the received signal intensity is not larger than the predetermined value, the arithmetic unit 34 acquires the second amplified signal output by the ADC 33 and corresponding to the PD 11 and derives the received signal intensity of the second amplified signal. Because the second amplified signal is a voltage signal amplified by 20 times, the arithmetic unit 34 derives 1/20 of the received signal intensity of the second amplified signal as the final received signal intensity. By the above process, the arithmetic unit 34 derives the received signal intensitys of the amplification signals corresponding to all of the PDs 11.

In the above description, the arithmetic unit 34 determines the ADC of which the output value is used, according to whether the received signal intensity of the first amplified signal of each PD 11 stored when the first selection signal is input is larger than 0.05 mW. However, the ADC of which the output value is used may be determined as follows. That is, if the received signal intensity of the first amplified signal is in a range of 0.025 mW to 6.5535 mW, the arithmetic unit 34 uses the output value of the ADC 32 and if the received signal intensity is in a range of 0 mW to 0.1 mW, the arithmetic unit 34 uses the output value of the ADC 33. In 0.025 mW to 0.1 mW to be the overlapped use range, the ADC output value to be used may be determined according to the ADC of which the output value is used immediately before. For example, in the case in which the output value of the ADC 32 is used immediately before, if the received signal intensity is equal to or larger than 0.025 mW, the output value of the ADC 32 is used and if the received signal intensity is smaller than 0.025 mW, the output value of the ADC 33 is used. In addition, in the case in which the output value of the ADC 33 is used immediately before, if the received signal intensity is equal to or smaller than 0.1 mW, the output value of the ADC 33 is used and if the received signal intensity is larger than 0.1 mW, the output value of the ADC 32 is used, for example. By performing such a determination, hysteresis can be given to whether the output value of which ADC is used. Such a hysteresis characteristic suppresses the ADC 32 and the ADC 33 from being frequently switched due to an influence of measurement error, when the received signal intensity of the first amplified signal is about 0.05 mW, and is desirable for stabilizing measurement and securing measurement precision.

Figure 5:
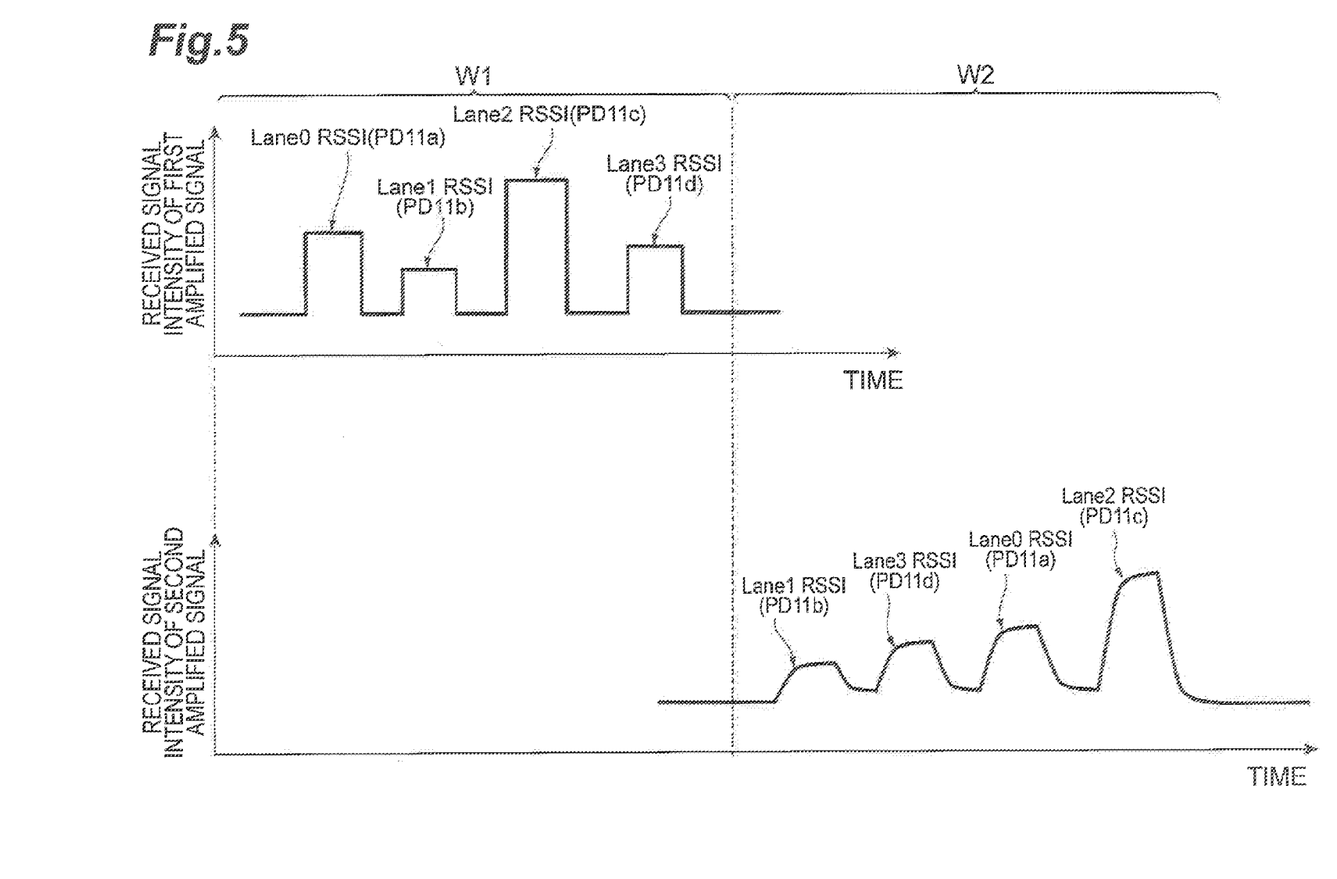
FIG. 5 is a diagram illustrating output waveforms of a low-gain amplifier 22 and a high-gain amplifier 23 of FIG. 2.

Here, derivation examples of the received signal intensity by the MCU 30 will be described with reference to FIGS. 2 and 5. FIG. 5 is a diagram illustrating output waveforms of the low-gain amplifier 22 and the high-gain amplifier 23. In FIGS. 2 and 5, "Lane0 RSSI" shows the case in which a selection signal to select the PD 11a is input and a current signal output by the PD 11a is input to the RSSI circuit 20. Likewise, "Lane1 RSSI" shows the case in which a current signal output by the PD 11b is input to the RSSI circuit 20, "Lane2 RSSI" shows the case in which a current signal output by the PD 11c is input to the RSSI circuit 20, and "Lane3 RSSI" shows the case in which a current signal output by the PD 11d is input to the RSSI circuit 20.

First, the first selection signal is input by the PD selector 31 in the predetermined order of the PD 11a, the PD 11b, the PD 11c, and the PD 11d. In this case, the first amplified signal is acquired by the arithmetic unit 34 and the received signal intensity of the first amplified signal for each PD 11 is derived. If the received signal intensity of the first amplified signal increases in order of the PD 11b, the PD 11d, the PD 11a, and the PD 11c as illustrated in an output waveform W1, the PD selector 31 inputs the second selection signal such that the PD is selected in order of the PD 11b, the PD 11d, the PD 11a, and the PD 11c over time. In addition, when all of the received signal intensitys of the first amplified signals of the individual PDs 11 acquired when the first selection signals are input are smaller than the predetermined value, the received signal intensity of the second amplified signal for each PD 11 is derived by the arithmetic unit 34. In the output waveform W2 of the second amplified signal, the received signal intensitys increase in order of the PD 11b, the PD 11d, the PD 11a, and the PD 11c over time.

Figure 6:
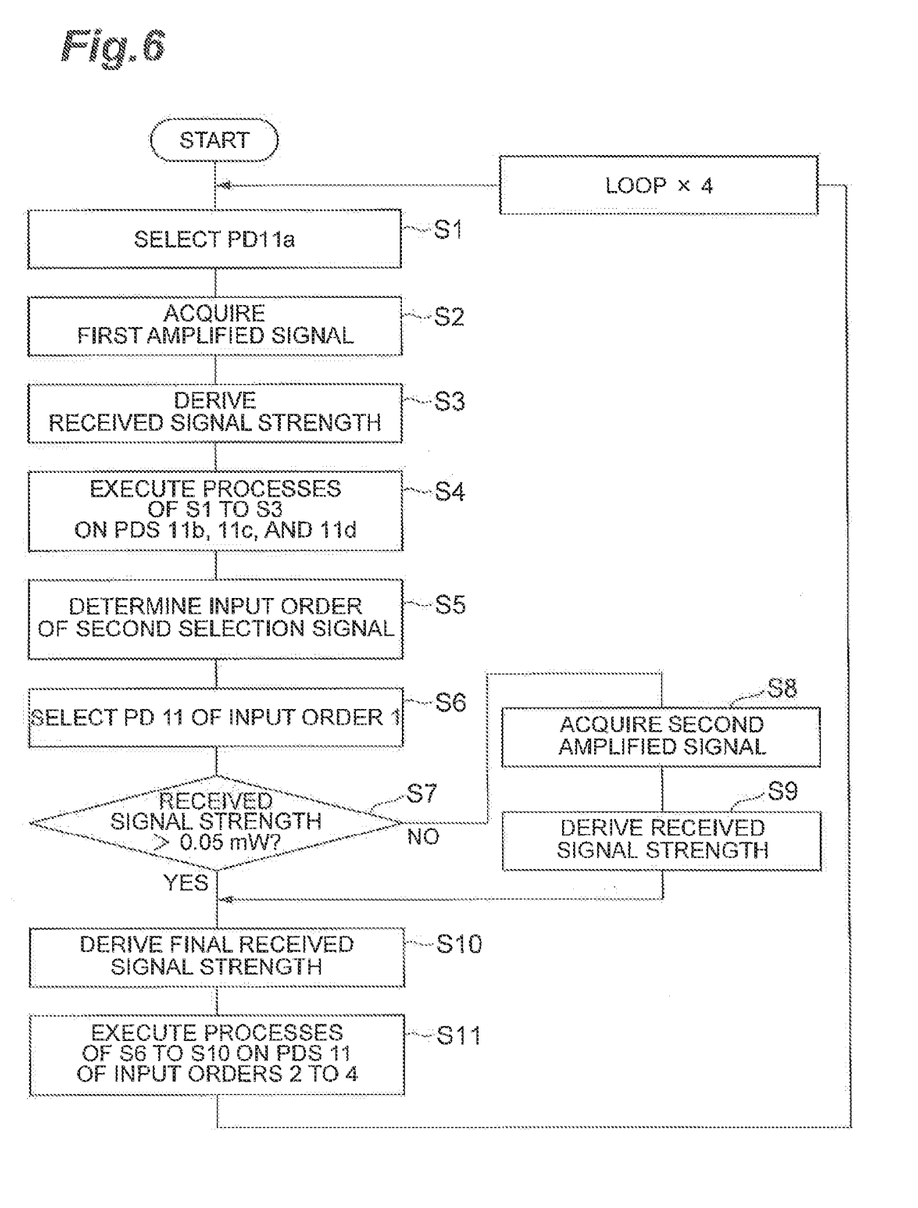
FIG. 6 is a flowchart illustrating a process for deriving received signal intensity in an MCU of FIG. 2.

Next, a process for deriving the received signal intensity by the arithmetic unit 34 will be described using FIG. 6. FIG. 6 is a flowchart illustrating the process for deriving the received signal intensity. In the PD selector 31, order of the PD 11a, the PD 11b, the PD 11c, and the PD 11d is stored as selection order of the first selection signal. In this case, first, the first selection signal to select the PD 11a is input to the decoder 12 of the integrated optical receiver module 10 by the PD selector 31 (step S1).

According to the first selection signal, the current signal output by the PD 11a is input to the current-to-voltage converter 21, the voltage signal output from the current-to-voltage converter 21 is input to the low-gain amplifier 22 and the high-gain amplifier 23, and the first amplified signal output from the low-gain amplifier 22 is input to the ADC 32 of the MCU 30. In addition, the first amplified signal output after the AD conversion by the ADC 32 is acquired by the arithmetic unit 34 (step S2). In addition, the received signal intensity of the first amplified signal based on the current signal output by the PD 11a is derived by the arithmetic unit 34 (step S3).

The processes of S1 to S3 are also executed on the PD 11b, the PD 11c, and the PD 11d (step S4). Thereby, the received signal intensitys of the first amplified signals based on the current signals output by the PD 11b, the PD 11i, and the PD 11d are derived. The arithmetic unit 34 inputs the received signal intensity of the first amplified signal for each PD 11 to the PD selector 31 and stores the received signal intensity in a storage device.

Next, input order of the second selection signal is determined by the PD selector 31 (step S5). Specifically, the input order of the second selection signal is determined such that the PD 11 is selected in ascending order of the received signal intensity, on the basis of the received signal intensity of the first amplified signal corresponding to the first selection signal. When all signal intensitys are small and the magnitude of the received signal intensity cannot be determined, the input order of the second selection signal may be set as any order. In this case, if an embedded signal exists in the output waveform of the second amplified signal according to the second selection signal, the input order of the second selection signal may be determined again on the basis of information thereof.

In addition, the second selection signal to select the PD 11 of which the input order is the first is input by the PD selector 31 (step S6). According to the second selection signal, the current signal output by the PD 11 is input to the current-to-voltage converter 21, the voltage signal output from the current-to-voltage converter 21 is input to the low-gain amplifier 22 and the high-gain amplifier 23, and the second amplified signal output from the high-gain amplifier 23 is input to the ADC 33 of the MCU 30.

Here, it is determined by the arithmetic unit 34 whether the received signal intensity of the first amplified signal of the PD 11 stored when the first selection signal is input is larger than a predetermined value (in this case, 0.05 mW) (step S7). In addition, only the PD 11 of which the received signal intensity is smaller than the predetermined value may be previously set as an order determination target. In this case, the process of S7 becomes unnecessary. When the received signal intensity is not larger than the predetermined value, the second amplified signal for the second selection signal is acquired from the ADC 33 by the arithmetic unit 34 (step S8) and the received signal intensity of the second amplified signal is derived (step S9). Because the second amplified signal is a voltage signal amplified by 20 times, a value corresponding to 1/20 of the received signal intensity of the second amplified signal is derived as the final received signal intensity (step S10). Meanwhile, in S7, when it is determined that the received signal intensity of the first amplified signal at the time of inputting the first selection signal is larger than the predetermined value, the received signal intensity of the first amplified signal is derived as the final received signal intensity by the arithmetic unit 34 (step S10).

The processes of S6 to S10 are also executed on the PDs 11 of which the input order is second to fourth (S11). The processes of S8 and S9 are not executed when it is determined in S7 that the received signal intensity of the first amplified signal is larger than the predetermined value. If the processes of S1 to S11 are executed four times, the process for deriving the received signal intensity is completed. Even when the second amplified signal is acquired or not acquired according to whether the received signal intensity of the first amplified signal is larger than the predetermined value, (intensitys) are arranged sequentially from a (intensity) having the small magnitude in the voltage waveform of the second amplified signal by the second selection signal, as illustrated at the lower side of FIG. 5. Therefore, a small mountain can be avoided from being hidden by a tail of a large intensitys in the voltage waveform, at all times. As a result, an effect thereof can be acquired without depending on the method of determining the predetermined value. In addition, because each amplification signal and each received signal intensity derived therefrom are in a relationship of a linear increasing function, the first amplified signal may be stored in the storage device (not illustrated in the drawings) to generate the second selection signal.

Next, a function and an effect of the optical receiving unit 50 according to this embodiment will be described.

In the optical receiving unit 50, the received signal intensity of the first amplified signal is acquired on the basis of the current signal output by each PD 11. In addition, the received signal intensity of the second amplified signal of which the gain is higher than the gain of the first amplified signal is acquired on the basis of the second selection signal to select each PD 11 in ascending order of the received signal intensity of the first amplified signal.

When the received signal intensity of the current signal output by the PD 11 is acquired and the intensity of the signal is weak, the signal is amplified by the high-gain amplifier and the received signal intensity is acquired. In the high-gain amplifier, it is necessary to narrow a band of a signal to be measured to remove noise at the time of amplifying the signal. When the band is narrowed, a rising edge and a falling edge of the output waveform of the amplification signal may become blunt (refer to FIG. 7). For this reason, if the received signal intensity of the previously output received signal is large and the received signal intensity of the subsequently output received signal is small, the output waveform of the subsequently output received signal may be embedded in a tail of the output waveform of the previously output received signal.

Figure 8A:
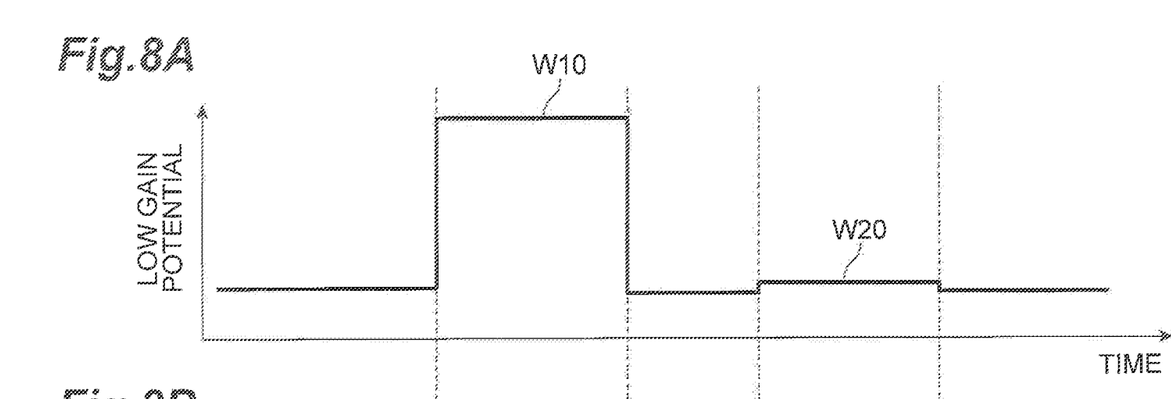
FIGS. 8A and 8B are diagrams illustrating a state in which an output waveform is embedded in the related art.
Figure 8B:
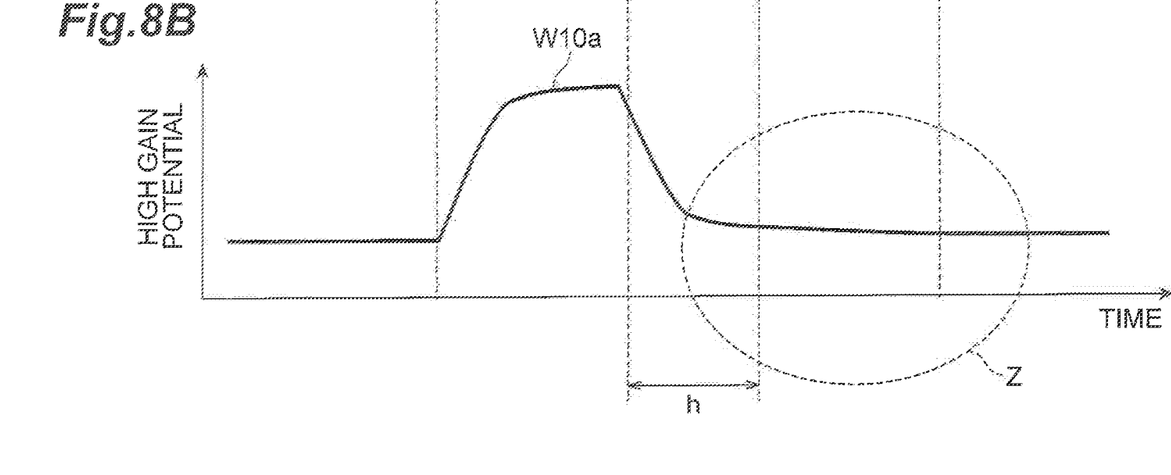
Figure 9:
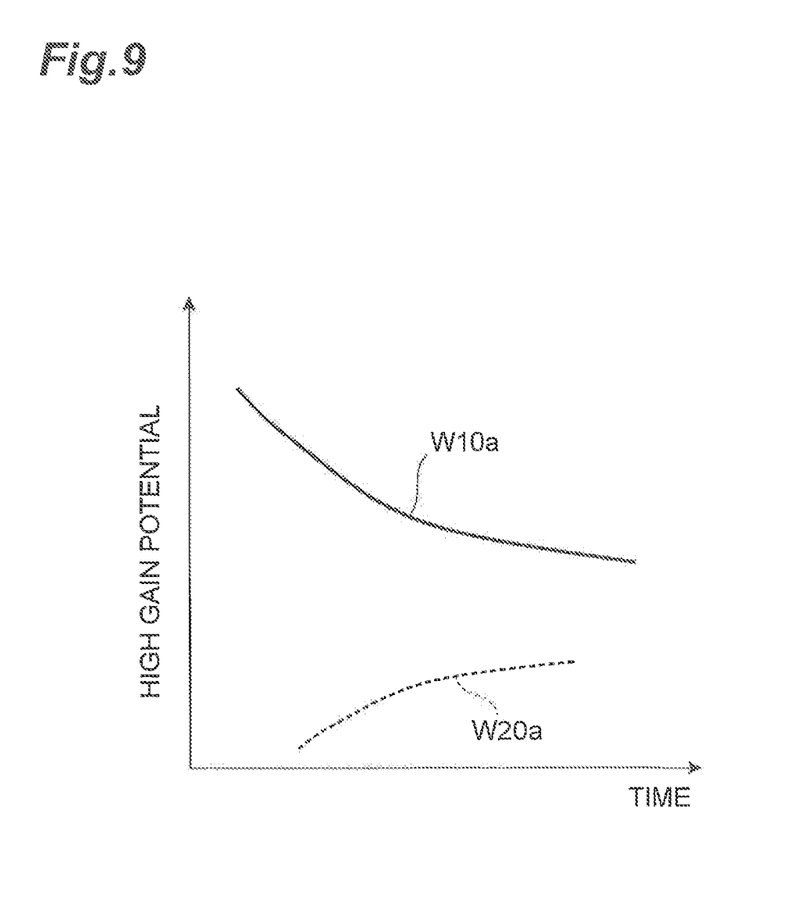
FIG. 9 is a diagram illustrating a state in which an output waveform is embedded in the related art.

Even in the case in which the received signal intensity of the previously output received signal is strong and the received signal intensity of the subsequently output received signal is weak, as illustrated in FIG. 8A, when a signal is amplified in an amplifying circuit in which a signal passing band is sufficiently wide, an output waveform is not blunt. For this reason, both a previously measured output waveform W10 and a subsequently measured output waveform W20 can be measured without causing a problem. However, as illustrated in FIG. 8B, when a signal is amplified in a circuit in which the signal passing band is restricted, if a switching time h of a received signal is the same as that at the time of the amplification in the low-gain amplifier, an edge of a previously measured output waveform W10a becomes blunt, so that a subsequently measured output waveform W20a may be embedded (refer to FIG. 9 to be an enlarged view of Z of FIG. 8B). For this reason, in the related art, when a received signal is measured using an amplifying circuit in which a signal band is restricted, it is necessary to increase a switching time of a received signal to a degree at which the output waveform of the subsequently received signal is not embedded in the blunt output waveform.

In the optical receiving unit 50, because the second selection signal is input in ascending order of the received signal intensity, on the basis of the received signal intensity of the first amplified signal of each wavelength acquired previously, and the second amplified signal is acquired, the output waveform of the subsequently output received signal is not embedded in the output waveform of the previously output received signal. For this reason, the received signal intensity can be measured without increasing the switching time of the received signal in consideration of the bluntness of the output waveform. Thereby, according to the present invention, when the received signal intensity is measured, a measurement time can be decreased while measurement precision is secured.

In addition, when the received signal intensity of the first amplified signal for the first selection signal is smaller than the predetermined value, the arithmetic unit 34 of the MCU 30 acquires the received signal intensity of the second amplified signal. As such, the second amplified signal is acquired only when the acquisition of the second amplified signal amplified by the high gain is necessary, so that a measurement time can be further decreased. For example, when the received signal intensity of the first amplified signal is larger than the predetermined value for all of the four received signals, the acquisition of the second amplified signal can be omitted.

In addition, the RSSI circuit 20 has the low-gain amplifier 22 to output the first amplified signal and the high-gain amplifier 23 to output the second amplified signal as the amplifying circuit, so that amplification signals having different gains can be surely output.

In addition, the response time of the low-gain amplifier 22, for example, the time constant of the output signal is shorter than the response time of the high-gain amplifier 23, for example, the time constant of the output signal. With respect to the response time of the amplifying circuit, the response time of the high-gain amplifier in which the blunt is generated at the rising edge and the falling edge of the output waveform by narrowing the output band is longer than the response time of the low-gain amplifier. Therefore, the response time of the low-gain amplifier 22 is set to be shorter than the response time of the high-gain amplifier 23 and the gain of each amplifying circuit is set differently, so that the received signal intensity can be surely measured for a wider range (dynamic range) of the received signal intensitys.

In addition, the capacitor C1 is provided in the high-gain amplifier 23. The noise can be surely removed in the high-gain amplifier 23 by changing the capacitance of the capacitor C1 to adjust the signal passing band and the signal passing band can be easily adjusted. By adjusting the response time by the capacitor C1, the response time of high-gain amplifier 23 can be easily adjusted.

The preferred embodiment of the present invention has been described. However, the present invention is not limited to the embodiment described above. For example, the low-gain amplifier and the high-gain amplifier are connected in parallel, but may be connected in parallel or in series. However, when the low-gain amplifier and the high-gain amplifier are connected in series, a wiring line is provided such that the output of each amplifying circuit is input to the MCU. The parallel connection or the serial connection is selected according to the characteristic of each optical receiving unit, so that a measurement time can be decreased while measurement precision is secured, in various configurations. When the low-gain amplifier and the high-gain amplifier are connected in series, a load capacity viewed from a previous step of the amplifying circuit can be decreased.

In addition, in the above description, the amplifying circuit includes the two circuits of the low-gain amplifier and the high-gain amplifier. However, the amplifying circuit may include three circuits of a low-gain amplifier, a middle gain amplifying circuit, and a high-gain amplifier. In addition, the amplifying circuit may include four circuits or more. A dynamic range to be a ratio of a minimum value and a maximum value of the received signal intensity that can be measured can be extended by increasing the number of amplifying circuits or voltage gain of each amplifying circuit.

In addition, in the above description, the number of PDs is four. However, the number of PDs may be three or less or five or more, as long as the number of PDs is plural. In addition, instead of the optical signals having the different wavelengths, optical signals having the same wavelength may be input to the plurality of PDs.

What is claimed is:

1. An optical receiver to receive a multiplexed optical signal having a plurality of optical signals, comprising:
    an optical receiver module configured to have a plurality of photo detectors each converting an optical signal to a current signal, the optical receiver module outputting a current signal selected from a plurality of current signals;
    a detecting circuit configured to convert the current signal output from the optical receiver module into a voltage signal, output a first amplified signal obtained by amplifying the voltage signal by a first amplifying circuit with a first gain, and output a second amplified signal obtained by amplifying the voltage signal by a second amplifying circuit with a second gain larger than the first gain; and
    an MCU configured to output a selection signal to the optical receiver module to select one of the current signals, and to receive the first amplified signal and the second amplified signal each corresponding to the selected current signal, and to store intensity information of the first amplified signal as digital data with respect to the selected current signal,
    wherein the MCU switches the selection signal to acquire intensity information of the second amplified signal with respect to all of the current signals in an ascending order of the stored intensity information of the first amplified signal, and derives intensity information of each of the optical signals from the acquired intensity information of the second amplified signal.

2. The optical receiver according to claim 1,
    wherein the second amplifying circuit has a response time longer than a response time of the first amplifying circuit.

3. The optical receiver according to claim 2,
    wherein the second amplifying circuit includes an integration circuit having a capacitor, the response time of the second amplifying circuit depending on capacitance of the capacitor.

4. The optical receiver according to claim 1,
    wherein the first amplifying circuit is connected in parallel to the second amplifying circuit.

5. The optical receiver according to claim 1,
    wherein the second amplifying circuit is connected in cascade to the first amplifying circuit.

6. A method to detect intensity of respective optical signals of a multiplexed optical signal by a plurality of photo detectors each converting the respective optical signals to respective current signals, comprising steps of:
    detecting current intensity corresponding to the respective optical signals through a current-to-voltage converter and a first amplifying circuit with a first gain by switching the respective current signals one by one with respect to all of the optical signals;
    storing current intensity information into a memory as digital data with respect to all of the optical signals; and
    determining the current intensity of the respective optical signals through the current-to-voltage converter and a second amplifying circuit with a second gain larger than the first gain by switching the respective current signals one by one in an ascending order of the current intensity information stored for the respective current signals in the memory.

7. The method of claim 6,
    further including a step of determining the order of switching respective current signals output by the photo detectors one by one to detect current intensity corresponding to the optical signals through the current-to-voltage converter and the first amplifying circuit.

* * * * *